United States Patent
Wamprecht et al.

(10) Patent No.: US 8,063,144 B2
(45) Date of Patent: Nov. 22, 2011

(54) POLYISOCYANATE MIXTURES, A PROCESS FOR THEIR PREPARATION AND THEIR USE IN COATING COMPOSITIONS

(75) Inventors: Christian Wamprecht, Neuss (DE); Martin Melchiors, Leichlingen (DE); Jörg Schmitz, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/625,790

(22) Filed: Nov. 25, 2009

(65) Prior Publication Data

US 2010/0076152 A1 Mar. 25, 2010

Related U.S. Application Data

(62) Division of application No. 11/286,717, filed on Nov. 23, 2005, now abandoned.

(30) Foreign Application Priority Data

Nov. 25, 2004 (DE) .......................... 10 2004 056 849

(51) Int. Cl.
*C08F 8/30* (2006.01)
(52) U.S. Cl. ...................... 525/123; 428/423.1; 525/127; 528/78; 528/80; 528/84; 560/25; 560/158; 560/334; 560/335; 560/355
(58) Field of Classification Search .................. 560/25, 560/158, 334, 335, 355; 528/78, 80, 84; 525/123, 127; 428/423.1
See application file for complete search history.

(56) References Cited

U.S. PATENT DOCUMENTS

| | | | |
|---|---|---|---|
| 3,124,605 A | 3/1964 | Wagner | |
| 3,358,010 A | 12/1967 | Britain | |
| 3,903,127 A | 9/1975 | Wagner et al. | |
| 3,996,154 A | 12/1976 | Johnson et al. | |
| 4,221,701 A | 9/1980 | Rasberger et al. | |
| 4,288,586 A | 9/1981 | Bock et al. | |
| 4,292,255 A | 9/1981 | Hennig et al. | |
| 4,324,879 A | 4/1982 | Bock et al. | |
| 4,339,566 A * | 7/1982 | Rosenkranz et al. | 427/66 |
| 4,379,905 A | 4/1983 | Stemmler et al. | |
| 4,419,513 A | 12/1983 | Breidenbach et al. | |
| 4,454,317 A | 6/1984 | Disteldorf et al. | |
| 4,487,928 A | 12/1984 | Richter et al. | |
| 4,518,761 A | 5/1985 | Richter et al. | |
| 4,663,377 A | 5/1987 | Hombach et al. | |
| 4,732,960 A | 3/1988 | Rasshofer et al. | |
| 5,252,696 A | 10/1993 | Laas et al. | |
| 5,387,367 A | 2/1995 | Haeberle et al. | |
| 5,395,863 A * | 3/1995 | Burns et al. | 522/71 |
| 5,461,135 A | 10/1995 | Malofsky et al. | |
| 5,508,372 A | 4/1996 | Brahm et al. | |
| 5,817,732 A | 10/1998 | Asahina et al. | |
| 5,914,383 A | 6/1999 | Richter et al. | |
| 6,017,998 A | 1/2000 | Duan et al. | |
| 6,090,939 A | 7/2000 | Richter et al. | |
| 6,107,484 A | 8/2000 | Richter et al. | |
| 6,426,414 B1 | 7/2002 | Laas et al. | |
| 6,583,215 B2 | 6/2003 | Probst et al. | |
| 6,624,238 B1 | 9/2003 | Ott et al. | |
| 6,767,958 B2 | 7/2004 | Laas et al. | |
| 2001/0018537 A1 | 8/2001 | Bernard et al. | |
| 2001/0021746 A1 | 9/2001 | Nabavi et al. | |
| 2002/0007036 A1 | 1/2002 | Bruchmann et al. | |
| 2003/0138641 A1 | 7/2003 | Fukudome et al. | |
| 2003/0138642 A1 | 7/2003 | Kohler et al. | |
| 2003/0158328 A1 | 8/2003 | Nabavi et al. | |
| 2004/0034162 A1 | 2/2004 | Laas et al. | |
| 2005/0154175 A1 | 7/2005 | Nabavi et al. | |
| 2005/0239989 A1 | 10/2005 | Haberle et al. | |
| 2005/0245675 A1 | 11/2005 | Haberle et al. | |
| 2006/0111539 A1 | 5/2006 | Wamprecht et al. | |
| 2007/0104962 A1 | 5/2007 | Laas et al. | |

FOREIGN PATENT DOCUMENTS

CA 2244486 A1 2/1999

(Continued)

*Primary Examiner* — John Cooney
(74) *Attorney, Agent, or Firm* — Connolly Bove Lodge & Hutz LLP

(57) ABSTRACT

The present invention relates to polyacrylate-modified polyisocyanates which are i) prepared from aromatic, araliphatic, cycloaliphatic and/or aliphatic polyisocyanates having an NCO content of 5% to 25% by weight, an NCO functionality $\geq 2$ and a viscosity measured as solvent free resin of 150 to 200,000 mPa·s at 23° C., and ii) contain at least one structural unit of the formula (I)

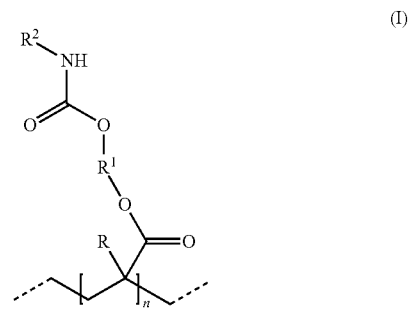

R is hydrogen or a methyl group,
$R^1$ is an optionally heteroatom-containing hydrocarbon radical and
$R^2$ is a hydrocarbon radical having at least one isocyanate group and optionally urethane, allophanate, biuret, uretdione, isocyanurate and/or iminooxadiazinedione groups and
n is a number $\geq 1$;
and to processes for preparing these polyisocyanates and to binder compositions containing these polyisocyanates, which may be hydrophilically modified and a compound having NCO-reactive groups.

2 Claims, No Drawings

FOREIGN PATENT DOCUMENTS

| | | |
|---|---|---|
| DE | 1090196 B | 10/1960 |
| DE | 1101394 B | 3/1961 |
| DE | 1644809 A1 | 1/1971 |
| DE | 2456864 A1 | 6/1975 |
| DE | 2417353 A1 | 10/1975 |
| DE | 3100263 A1 | 8/1982 |
| DE | 3144672 A1 | 5/1983 |
| DE | 10013187 A1 | 10/2001 |
| EP | 0540985 | 5/1993 |
| EP | 0646608 A1 | 4/1995 |
| EP | 798299 A1 | 10/1997 |
| EP | 0896009 A1 | 2/1999 |
| EP | 0962454 A1 | 12/1999 |
| EP | 0962455 A1 | 12/1999 |
| EP | 0965604 A1 | 12/1999 |
| EP | 1050551 A2 | 11/2000 |
| GB | 1234972 A | 6/1971 |
| MX | 9702144 A | 6/1997 |
| WO | WO-99/67312 | 12/1999 |
| WO | WO-9967312 | 12/1999 |
| WO | WO-2005/047354 | 5/2005 |
| WO | WO-2005/047357 | 5/2005 |

\* cited by examiner

POLYISOCYANATE MIXTURES, A PROCESS FOR THEIR PREPARATION AND THEIR USE IN COATING COMPOSITIONS

CROSS-REFERENCE TO RELATED APPLICATIONS

This application claims priority under 35 U.S.C. §120 and is a divisional application of U.S. patent application Ser. No. 11/286,717, filed on Nov. 23, 2005, which is now abandoned, which in turn claimed priority under 35 U.S.C. §119 of German Patent Application No. 10 2004 056849.9, filed Nov. 25, 2004.

BACKGROUND OF THE INVENTION

1. Field of the Invention

The present invention relates to modified polyisocyanate mixtures based on polyisocyanates and polyacrylate units, to a process for preparing them and to their use as a curing component in polyurethane coating compositions.

2. Description of Related Art

With polyurethane coating compositions, particularly if they are to be used in the vehicle, industrial or furniture sectors, especially great value is generally placed on the resistance of such coating compositions to different environmental influences. The criteria are frequently hardness, chemical resistance and solvent resistance, scratch resistance, including what is called "reflow", light stability and weather resistance.

By "reflow" is meant the ability of a cured coating (film) to compensate for minor film damage (in the µm range), caused by scratching or impact on the film, by cold flow of the coating composition into the damaged site.

To improve the scratch resistance use is frequently made of oligomeric polyisocyanates based on hexamethylene diisocyanate (HDI) as the polyisocyanate component. The polyurethane coating compositions prepared from such components are generally tough and elastic with good reflow. Disadvantages of such coating compositions include the somewhat slow drying at room temperature and slightly elevated temperature, and also the merely moderate acid resistance. Hard, fast-drying polyurethane coating compositions with very good acid resistance are generally obtained with polyisocyanate curatives based on isophorone diisocyanate (IPDI). The scratch resistance and the reflow of such coating compositions, however, are generally inadequate. Moreover, IPDI-based polyisocyanates have a high viscosity and a relatively low isocyanate content.

U.S. Pat. No. 4,419,513 describes isocyanurate polyisocyanates which are obtained by the mixed trimerization of HDI and IPDI. It is disclosed that the mixed trimers have desirable properties in terms of hardness and elasticity. A disadvantageous consequence with these mixed trimers is that, due to the fraction of IPDI, which is necessary for the requisite hardness and rapid physical drying, the amount of isocyanate groups (relative to the molecular weight) is lower than in the case of pure HDI trimers, with attendant economic drawbacks.

EP-A 0 646 608 relates to polyisocyanates which are obtained by the cyclic trimerization of at least one aliphatic or alicyclic diisocyanate either after its reaction with a polyfunctional alcohol or by trimerization in the presence of such an alcohol. Although such polyisocyanates have high functionalities, the fraction of polyfunctional alcohol in the polyisocyanate molecule prepared lowers the weight fraction of isocyanate groups per molecule and, as a consequence of the urethane groups that form, there is a marked increase in viscosity. With regard to the use of the polyisocyanate, this necessitates an economically undesirably high amount of polyisocyanate curative and an increased volume of solvent for adjusting the application viscosity of the coating composition.

U.S. Pat. No. 4,454,317 describes polyisocyanate containing isocyanurate groups which are obtainable by trimerizing HDI. Described by way of example is an HDI trimer having an NCO content of 20.8% by weight and a viscosity of 14 Pas at room temperature. This patent does not disclose anything regarding the possibility of using polyisocyanates of such high viscosity, in combination with suitable polyols, to prepare polyurethane coating compositions having improved chemical resistance.

The modified polyisocyanate mixtures disclosed in DE-A 100 13 187 are notable for a high isocyanate functionality, but this is largely obtained at the expense of the isocyanate content of the respective polyisocyanate. In the preparation of high functionality or high molecular weight polyisocyanates by the oligomerization of diisocyanates by known isocyanate reactions such as biuretization, urethanization, trimerization and allophanatization, large numbers of isocyanate groups are generally consumed for these molecular weight-increasing and functionality-building isocyanate reactions. In general the higher the molecular weight of the polyisocyanate becomes, the more the isocyanate content of the end product falls. This circumstance harbours economic drawbacks.

Therefore, it is an object of the present invention to provide new polyisocyanate compositions, which function as a curing component in polyurethane coating compositions and, in so doing, are able to satisfy the broad spectrum of coating properties that are required, and do not exhibit the stated disadvantages of prior art polyisocyanates. These new polyisocyanate compositions should be variable and should represent an optimum in terms of achievable isocyanate content, molecular weight and functionality.

This object may be achieved with the polyacrylate-modified polyisocyanate of the present invention, which exhibit the required properties. These new polyisocyanates may be obtained by partial reaction of known polyisocyanates with hydroxy-functional unsaturated compounds to form urethane groups and subsequent polymerization of the unsaturated groups and optionally copolymerization with other unsaturated compounds. These new polyisocyanate mixtures are capable of broad variation in terms of their composition, their molecular weight and their functionality and thus in terms of their overall profile of properties.

The modified polyisocyanate mixtures of the invention have very good compatibility with a multitude of polyols and can be formulated to polyurethane coating compositions having a broad spectrum of properties. Particularly advantageous when compared to the corresponding base polyisocyanates have proven to be the markedly improved physical drying and significantly higher solvent resistance and chemical resistance of corresponding polyurethane coating compositions, particularly those based on HDI, without loss of toughness and elasticity, the good reflow or the high scratch resistance.

SUMMARY OF THE INVENTION

The present invention relates to polyacrylate-modified polyisocyanates which are i) prepared from aromatic, araliphatic, cycloaliphatic and/or aliphatic polyisocyanates having an NCO content of 5% to 25% by weight, an NCO functionality $\geq 2$, and a viscosity measured as solvent free resin of 150 to 200,000 mPa·s at 23° C., and ii) contain at least one structural unit of the formula (I)

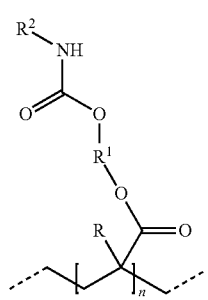

R is hydrogen or a methyl group,
R¹ is an optionally heteroatom-containing hydrocarbon radical and
R² is a hydrocarbon radical having at least one isocyanate group and optionally urethane, allophanate, biuret, uretdione, isocyanurate and/or iminooxadiazinedione groups and
n is a number $\geq 1$.

The present invention also relates to a process for preparing these polyisocyanates by reacting a portion of the isocyanate groups of
A) a starting polyisocyanate
with
B) a monoalcohol containing acrylate and/or methacrylate groups, to form urethane groups, and subsequently to or simultaneously with the urethanization, reacting the unsaturated groups of the resulting reaction product by free-radically initiated polymerization optionally with
C) other unsaturated monomers.

The present invention also relates to binder compositions containing the polyacrylate-modified polyisocyanates of the invention, optionally having blocked NCO groups, and a compound having NCO-reactive groups.

The present invention also relates to water-dilatable or aqueous binder compositions containing the polyacrylate-modified polyisocyanates of the invention, wherein a portion of the NCO groups have been hydrophilically modified with polyether units, and a compound having NCO-reactive groups.

DETAILED DESCRIPTION OF THE INVENTION

The hydrocarbon radical R² is based preferably on aromatic, cycloaliphatic, araliphatic and/or aliphatic di- and/or polyisocyanates and preferably contains at least one of the structural units referred to as optional.

Starting polyisocyanates A) include the di- and/or polyisocyanates which are known in polyurethane chemistry. It is immaterial whether these isocyanates are prepared with phosgene or by phosgene-free processes. Preferred starting polyisocyanates are lacquer polyisocyanates containing urethane, uretdione, allophanate, biuret, isocyanurate and/or iminooxadiazinedione groups and prepared from monomeric di- or triisocyanates.

Monomeric isocyanates, which can be used alone or in admixture include 1,6-di-isocyanatohexane, 1-isoeyanato-3,3,5-trimethyl-5-isocyanatomethylcyclohexane (isophorone diisocyanate), 4,4'-diisocyanatodicyclohexylmethane, 4-isocyanatomethyl-1,8-octane diisocyanate, 1,4-diisocyanatocyclohexane, 1-methyl-2,4-diisocyanatocyclohexane and mixtures thereof with up to 35% by weight, based on the total mixture, of 1-methyl-2,6-diisocyanatocyclohexane, and 2,4-diisocyanatotoluene (TDI) and its mixtures with up to 35% by weight, based on the total mixture, of 2,6-diisocyanatotoluene.

Preferably, lacquer polyisocyanates are used as component A). They include lacquer polyisocyanates containing urethane groups, which are prepared by reacting 2,4- and optionally 2,6-diisocyanatotoluene or 1-methyl-2,4- and optionally 1-methyl-2,6-diisocyanatocyclohexane with substoichiometric amounts of trimethylolpropane or its mixtures with monomeric diols, such as the isomeric propanediols or butanediols, for example. The preparation of these lacquer polyisocyanates containing urethane groups in virtually monomer-free form is described for example in DE-A 109 01 96.

The lacquer polyisocyanates containing biuret groups include in particular those based on 1,6-diisocyanatohexane and prepared as described, for example, in EP-A 0 003505, DE-B 1 101 394, U.S. Pat. Nos. 3,358,010 or 3,903,127.

The lacquer polyisocyanates containing isocyanurate groups include the trimers or mixed trimers of the diisocyanates exemplified above such as the isocyanurate-group-containing polyisocyanates based on TDI as described in GB-A 1 060 430, GB-A 1 506 373 or GB-A 1 485 564; and the mixed trimers of TDI with 1,6-diisocyanatohexane, which are described, for example, in DE-A 164 480 9 or DE-A 314 467 2. Preferred lacquer polyisocyanates containing isocyanurate groups are the aliphatic, aliphatic/cycloaliphatic and/or cycloaliphatic trimers or mixed trimers based on 1,6-diisocyanatohexane and/or isophorone diisocyanate that are obtained, for example, as described in U.S. Pat. Nos. 4,324,879, 4,288,586, DE-A 310 026 2, DE-A 310 026 3, DE-A 303 386 0 or DE-A 314 467 2.

Other suitable lacquer polyisocyanates are those containing iminooxadiazinedione groups, which may be prepared as described, for example, in EP-A 798 299, EP-A 896 009, EP-A 962 454 and EP-A 962 455.

Especially preferred starting polyisocyanates are urethane, uretdione, allophanate, biuret, isocyanurate and/or iminooxadiazinedione group-containing polyisocyanates exclusively containing aliphatically and/or cycloaliphatically bound NCO groups.

Starting polyisocyanates A) preferably have an NCO group content of 5% to 25% by weight, an average NCO functionality of 2.0 to 5.0, preferably 2.8 to 4.0, and a residual monomeric diisocyanate content of below 1% by weight, preferably below 0.5% by weight. The starting polyisocyanates have a viscosity of 150 to 200,000 mPa·s at 23° C., measured using a rotational viscometer in accordance with DIN 53019.

Preferred acrylate and/or methacrylate group-containing monoalcohols B) include the hydroxy-functional esters of acrylic and/or methacrylic acid. Suitable esters include hydroxyethyl acrylate, hydroxyethyl methacrylate, hydroxypropyl acrylate (isomer mixture formed in the addition reaction of propylene oxide with acrylic acid), hydroxypropyl methacrylate (isomer mixture formed in the addition reaction of propylene oxide with methacrylic acid) and butanediol monoacrylate.

Also suitable are the reaction products of the preceding hydroxy esters of acrylic or methacrylic acid with different amounts of cyclic lactones or monoepoxides. A preferred cyclic lactone is ε-caprolactone and preferred monoepoxides are ethylene oxide, propylene oxide or mixtures thereof.

Also suitable as hydroxyl-functional compounds B) are the reaction products of glycidyl acrylate or glycidyl methacrylate with monocarboxylic acids, or the reaction products of acrylic or methacrylic acid with monoepoxides.

Besides the (meth)acrylate-functional monoalcohols, other suitable compounds B) include allyl alcohol or its alkoxylation products, such as mono-, di- or polyethoxylated allyl alcohol. Preference, however, is given to the exclusive use of the previously described (meth)acrylate-functional alcohols as compounds B).

In addition to the hydroxyl-functional unsaturated alcohols in B), non-functional, olefinically unsaturated monomers, such as for example styrene, methyl methylacrylate, ethyl acrylate, butyl acrylate, 2-ethylhexyl acrylate and acrylonitrile etc., can also be added. These monomers do not react with the starting isocyanates in A) but can copolymerize later with the unsaturated groups of the alcohols B).

The reaction of A) with B) can take place in the absence of solvent or in the presence of solvents. Suitable solvents are those which do not react with isocyanate groups or hydroxyl groups. Examples include aliphatic, cycloaliphatic and/or aromatic hydrocarbons such as alkylbenzenes, toluene and xylene; esters such as ethyl acetate, n-propyl acetate, isopropyl acetate, n-butyl acetate, n-hexyl acetate, 2-ethylhexyl acetate, ethyl propionate, butyl propionate, pentyl propionate, ethylene glycol monoethyl ether acetate and the corresponding methyl ether acetate; ethers such as ethylene glycol acetate monomethyl, monoethyl and monobutyl ether; ketones such as acetone, methyl ethyl ketone, methyl isobutyl ketone and methyl n-amyl ketone; and mixtures of these solvents.

In the urethanization reaction A) and B) are reacted with one another in a ratio such that only some of the NCO groups of A) are consumed. It is preferred to use a quantity of component B) such that not more than 40 mole %, preferably not more than 30 mole %, more preferably not more than 25 mole % and most preferably not more than 20 mole %, based on the moles of isocyanate groups in starting polyisocyanates A), are converted to urethane groups.

The urethanization may take place at room temperature (23° C.), but can also be carried out above or below this temperature. In order to accelerate the reaction it can be carried out at up to 160° C. Higher temperatures are not preferred, since an uncontrolled polymerization of the acrylate or methacrylate groups may occur.

Preferably, the unsaturated (meth)acrylate groups are not reacted by free-radical (co)polymerization until after urethanization has ended.

Suitable initiators for carrying out the (co)polymerization of the unsaturated groups of unsaturated urethanized polyisocyanates C) and if need further unsaturated groups of non functional compounds are the known free-radical initiators based on azo or peroxide compounds which within the temperature range specified below possess a half-life whose duration is sufficient for the polymerization, i.e. a half-life of about 5 seconds to about 60 minutes. Suitable examples include azodiisobutyronitrile, azobis-2-methylvaleronitrile, 2,2'-azobis -(2-methylpropanenitrile), 2,2"-azobis(2-methylbutanenitrile), 1,1'-azobis(cyclo-hexanecarbonitrile), symmetrical diacyl peroxides (such as acetyl, propionyl or butyryl peroxide), benzoyl peroxides (such as those substituted by bromine, nitro, methyl or methoxy groups), lauryl peroxides, peroxydicarbonates (such as diethyl, diisopropyl, dicyclohexyl and dibenzoyl peroxydicarbonate), tert-butyl peroxyisopropyl carbonate, tent-butyl peroxy-2-ethylhexanoate, tert-butyl peroxy-3,5,5-trimethylhexanoate, tert-butyl perbenzoate, tert-butyl peroxydiethylacetate, tert-butyl peroxyisobutyrate, hydroperoxides (such as tert-butyl hydroperoxide, and cumene hydroperoxide), dialkyl peroxides (such as dicumyl peroxide, tert-butyl cumyl peroxide, di-tert-butyl peroxide and di-tert-amyl peroxide), 1,1-di-tert-butylperoxy -3,3,5-trimethylcyclohexane and 1,1-di-tert-butylperoxycyclohexane.

Preferably the polymerization reaction takes place at a temperature of 50 to 240° C., more preferably 60 to 220° C. and most preferably 70 to 200° C. The polymerization can be carried out under a pressure of up to 15 bar.

The initiators are used in amounts of 0.05% to 15%, preferably 0.1% to 10% and more preferably 0.2% to 8% by weight, based on the total amount of unsaturated compounds in B).

To carry out the polymerization reaction, urethane-modified polyisocyanate mixture C) is heated to the desired polymerization temperature. Then the free-radical initiator is metered into the reaction mixture and the free-radical polymerization, which is initiated by the decomposition of the free-radical initiator, is carried out at the set polymerization temperature. This polymerization temperature can also be altered as desired in order to perform specific molecular weight adjustments. After the end of the polymerization, the reaction mixture is cooled to room temperature. The resulting polyacrylate-modified polyisocyanates of the invention are generally pale-colored viscous liquids or solutions if solvents were employed.

It is also possible to meter into the reaction mixture during the performance of the polymerization other non-functional unsaturated monomers which can then copolymerize with the unsaturated polyisocyanates C).

It is also possible in the process of the invention to add known additives such as PU catalysts, e.g., N,N-dimethylbenzylamine, N-methylmorpholine, zinc octoate, tin(II) octoate or dibutyltin dilaurate.

The polyacrylate-modified polyisocyanates of the invention constitute valuable raw materials for the preparation of binder compositions for producing polyurethane-based coating, adhesive or sealant compositions.

The reactive isocyanate groups of the polyacrylate-modified polyisocyanates of the invention may be blocked with blocking agents and then used as crosslinkers in 1K (one-component) polyurethane (PU) coating compositions. Suitable blocking agents include ε-caprolactam, butanone oxime, phenol and/or phenol derivatives, secondary amities, 3,5-dimethylpyrazole, alkyl malonates or monoalcohols.

Suitable compounds having NCO-reactive groups are the known OH and/or NH-functional resins from coatings technology. Examples include polyesters, polyacrylates, polyurethanes, polyureas, polycarbonates or polyethers. Also suitable are hybrid resins or mixtures of different hydroxy-functional resins.

Preferably the resins used are hydroxy-functional and/or amino-functional and may contain carboxylic and/or sulphonic acid groups or epoxid groups. It is also possible to use non-functional resins, which dry physically or oxidatively, alone or in combination with hydroxy-functional resins, as binder compounds and reaction partners for the polyisocyanate mixtures of the invention.

These resins have hydroxyl contents of 0.5% to 15.0%, preferably 0.5% to 12.0%, more preferably 1.0% to 10.0% and most preferably 1.0% to 8.0% by weight, based on resin solids. The acid numbers of the solid resins are below 50 mg KOH/g, preferably below 30 mg KOH/g, more preferably below 20 mg KOH/g and most preferably below 15 mg KOH/g.

The preceding resins based on addition polymer and/or polyester, particularly on polyacrylate, are of particular interest with regard to the level of requirements in the fields of automotive OEM, automotive refinish and large-vehicle finishing, general industrial coating, plastics coating, corrosion control, and wood and furniture coating. In the construction sector or for coating mineral substrates it is preferred to employ polyether-based resins.

In the binder compositions of the invention the equivalent ratio of free and blocked NCO groups to the NCO-reactive groups in the binders is 5:1 to 1:2, preferably 2:1 to 1:2, more preferably 1.5:1 to 1:1.5 and most preferably 1.2:1 to 1:1.2.

If the NCO groups of the polyacrylate-modified polyisocyanates of the invention have not been blocked, the binder compositions have only a limited processing life of approximately 3 to 24 hours and are processed either as they are (transparent coating compositions), or preferably with the additional use of known additives. These optional additives can be added either to the mixture or to the individual components prior to their mixing.

Suitable additives include solvents such as ethyl acetate, n-propyl acetate, isopropyl acetate, n-butyl acetate, n-hexyl acetate, n-heptyl acetate, 2-ethylhexyl acetate, methoxypropyl acetate, methyl ethyl ketone, methyl isobutyl ketone, toluene, xylene, higher aromatics mixtures, white spirit and mixtures thereof.

Other additives include plasticizers such as tricresyl phosphate, phthalic diesters and chlorinated paraffins; pigments and fillers such as titanium dioxide, barium sulphate, chalk and carbon black; catalysts such as N,N-dimethylbenzylamine, N-methylmorpholine, zinc octoate, tin(II) octoate and dibutyltin dilaurate; flow control agents; thickeners; stabilizers such as substituted phenols; organo-functional silanes as adhesion promoters; light stabilizers; and UV absorbers. Examples of light stabilizers are sterically hindered amines, as described for example in DE-A 2 417 353 and DE-A 2 456 864. Preferred light stabilizers are bis(1,2,2,6,6-pentamethylpiperid-4-yl) sebacate, bis(2,2,6,6-tetramethylpiperid-4-yl) sebacate, and bis(1,2,2,6,6-pentamethylpiperid-4-yl) n-butyl(3,5-di-tert-butyl-4-hydroxybenzyl) malonate.

The moisture present in the fillers and pigments can be removed by drying beforehand or by the additional use of water absorbers, such as molecular sieve zeolites.

The coatings obtained from the binder compositions of the invention can be dried at room temperature with no need for any increase in temperature to achieve the optimal properties mentioned at the outset. When the binders are employed as refinish coating compositions, however, a temperature increase to about 60 to 100° C., preferably 60 to 80° C., for a period of 20 to 60 minutes is often advisable in order to shorten the drying time and cure time.

The resulting coating films are notable for high hardness, good elasticity, excellent weathering stability and chemical resistance, and high gloss. Particularly the cure times, both for initial physical drying and for chemical crosslinking, are very short, i.e., shorter than when using non-polyacrylate-modified polyisocyanates, so that coated service articles are very rapidly resistant to solvents and chemicals and can be taken into service.

The coating compositions employed in accordance with the invention are suitable in particular for the finishing of large vehicles, such as aircraft, railway coaches and trams and lorry bodies. Further preferred fields of use are automotive refinishing and the coating of plastics. The coating compositions are additionally suitable for corrosion control applications (such as the coating of bridges and power masts), wood and furniture coatings, general industrial coatings and automotive OEM coatings.

These coating compositions are applied by customary methods, such as spraying, casting, dipping, brushing, squirting or rolling. The coating compositions of the invention are suitable both for producing primer coats and for producing tie coats and are suitable in particular for producing pigmented topcoats and also basecoats and clearcoats on the substrates that are to be coated.

The invention is further illustrated but is not intended to be limited by the following examples in which all parts and percentages are by weight unless otherwise specified.

EXAMPLES

Abbreviations and ingredients used:
HEA: Hydroxyethyl acrylate
HEMA: Hydroxyethyl methacrylate
HPMA: Hydroxypropyl methacrylate
Desmodur® HL BA: Aromatic-aliphatic polyisocyanate based on toluene diisocyanate/hexamethylene diisocyanate (HDI), 60% in butyl acetate, NCO content 10.5%, available from Bayer MaterialScience AG, Leverkusen DE.
Desmodur® IL BA: Aromatic polyisocyanate based on toluene diisocyanate, 51% in butyl acetate, NCO content 8.0%, available from Bayer MaterialScience AG, Leverkusen DE.
Desmodur® 3200: Aliphatic, biuret group-containing polyisocyanate based on HDI, solvent-free, NCO content 23.0%, available from Bayer MaterialScience AG, Leverkusen DE.
Desmodur® N 3300: Isocyanurate group-containing polyisocyanate based on HDI, solvent-free, NCO content 21.8%, available from Bayer MaterialScience AG, Leverkusen DE.
Desmodur® N 3600: Low viscosity, isocyanurate group-containing polyisocyanate based on HDI, solvent-free, NCO content 23.0%, available from Bayer MaterialScience AG, Leverkusen DE.
Desmodur® N 75 BA: Aliphatic, biuret group-containing polyisocyanate based on HDI, 75% in butyl acetate, NCO content 16.5%, available from Bayer MaterialScience AG, Leverkusen DE.
Desmodur® Z 4470 BA: Isocyanurate group-containing polyisocyanate based on isophorone diisocyanate, 70% in butyl acetate, NCO content 11.9%, available from Bayer MaterialScience AG, Leverkusen DE.
Desmodur® XP 2410: Low-viscosity, iminooxadiazinedione group-containing polyisocyanate based on hexamethylene diisocyanate, solvent-free, NCO content 23.7%, available from Bayer MaterialScience AG, Leverkusen DE.
Peroxan® PO 49B: tert-Butyl peroxy-2-ethylhexanoate, 49% in butyl acetate, available from Pergan GmbH, Bocholt DE.

The following properties were determined: solids content (thick-film method: lid, 1 g sample, 1 h 125° C., convection oven, basis: DIN EN ISO 3251); viscosity (rotational viscometer VT 550 from Haake GmbH, Karlsruhe, DE, MV-DIN cup for viscosity <10,000 mPa·s/23° C., SV-DIN cup for viscosity >10,000 mPa·s/23° C.); NCO content (solvent: acetone, dibutylamine excess, urea formation, titration with 1 mol/l HCl, basis: DIN EN ISO 11909); and Hazen color number (Hazen color number: basis DIN 53995, Lico® 400 color number measuring instrument, Dr. Lange GmbH, Berlin, DE).

Preparation of the Polyacrylate-modified Polyisocyanates

A 1-liter three-necked flask with stirrer, reflux condenser and dropping funnel was charged with the respective stalling polyisocyanate and, when appropriate, butyl acetate as solvent, and this initial charge was heated to 130° C. under a nitrogen atmosphere. Then the unsaturated monoalcohol was metered in over a period of 10 minutes and the mixture was subsequently stirred further at 130° C. for 1 hour before the desired polymerization temperature (T) was set. When this temperature had been reached the polymerization initiator, Peroxan® PO 49B, was added in one portion, after which stirring took place at the set polymerization temperature for 1 hour. The mixture was then cooled to room temperature, giving the pale-colored, viscous polyisocyanates (PICs).

Table 1 below sets forth the respective raw materials, proportions and reaction conditions. Amounts are in g.

| PIC | Butyl acetate [g] | Desmodur N 3300 [g] | Desmodur N 3600 [g] | HEA [g] | HEMA [g] | Peroxan® [g] | T [° C.] |
|---|---|---|---|---|---|---|---|
| 1 | 75 | 412.25 | — | 12.11 | — | 0.64 | 130 |
| 2 | 75 | 412.25 | — | 12.11 | — | 0.64 | 100 |
| 3 | — | 679.00 | — | 19.95 | — | 1.05 | 130 |
| 4 | 75 | 408.00 | — | 16.15 | — | 0.85 | 130 |
| 5 | 75 | 408.00 | — | 16.15 | — | 0.85 | 100 |
| 6 | — | 672.00 | — | 26.60 | — | 1.40 | 130 |
| 7 | — | 672.00 | — | 26.60 | — | 1.40 | 100 |
| 8 | 75 | — | 412.25 | 12.11 | — | 0.64 | 130 |
| 9 | 75 | — | 412.25 | 12.11 | — | 0.64 | 100 |
| 10 | — | — | 679.00 | 19.95 | — | 1.05 | 130 |
| 11 | 75 | — | 408.00 | 16.15 | — | 0.85 | 130 |
| 12 | 75 | — | 408.00 | 16.15 | — | 0.85 | 100 |
| 13 | — | — | 672.00 | 26.60 | — | 0.85 | 130 |
| 14 | — | — | 672.00 | 26.60 | — | 0.85 | 100 |
| 15 | — | 676.62 | — | — | 22.33 | 1.05 | 130 |
| 16 | — | 668.78 | — | — | 29.82 | 1.40 | 130 |
| 17 | — | — | 676.62 | — | 22.33 | 1.05 | 130 |
| 18 | — | — | 668.78 | — | 29.82 | 1.40 | 130 |

Table 2 below sets forth the properties of inventive polyisocyanates PIC 1 to 18.

| PIC | Solids content [% by weight] | Viscosity at 23° C. [mPa·s] | NCO content [% by weight] | Hazen color number {APHA} |
|---|---|---|---|---|
| 1 | 84.7 | 593 | 16.8 | 0 |
| 2 | 85.2 | 726 | 16.8 | 0 |
| 3 | 99.9 | 13,012 | 20.0 | 0 |
| 4 | 85.0 | 948 | 16.3 | 0 |
| 5 | 84.6 | 1510 | 16.6 | 11 |
| 6 | 99.9 | 27,308 | 19.5 | 11 |
| 7 | 99.8 | 92,062 | 18.5 | 11 |
| 8 | 85.3 | 250 | 17.8 | 6 |
| 9 | 84.7 | 314 | 17.8 | 0 |
| 10 | 100.0 | 3703 | 21.1 | 11 |
| 11 | 85.1 | 440 | 17.4 | 9 |
| 12 | 85.4 | 664 | 17.4 | 0 |
| 13 | 99.9 | 8489 | 20.6 | 8 |
| 14 | 100 | 12,311 | 20.5 | 10 |
| 15 | 99.8 | 8958 | 20.8 | 2 |
| 16 | 99.9 | 12,511 | 20.4 | 11 |
| 17 | 99.9 | 3032 | 21.0 | 9 |
| 18 | 100 | 6706 | 20.5 | 11 |

Preparation of Modified Polyisocyanate PIC 19

Using the procedure described for Polyisocyanates 1-18, 604.8 g of Desmodur® XP 2410 in 35.0 g of butyl acetate were reacted with 23.94 g of HEA and the product was subsequently polymerized at 100° C. by the addition of 0.62 g of tert-butyl peroxy-2-ethylhexanoate in 35.64 g of butyl acetate. The resulting colorless polyisocyanate mixture had a solids content of 90% by weight, a viscosity of 1181 mPa·s, an isocyanate content of 19.8% by weight and a color number of 16 APHA.

Preparation of Modified Polyisocyanate PIC 20

Using the procedure described for Polyisocyanates 1-18, 676.63 g of Desmodur® Z 4470 were reacted with 15.63 g of HPMA in 7.00 g of solvent naphtha 100 and the product was subsequently polymerized at 150° C. by the addition of 0.74 g of di-tert-butyl peroxide. The resulting pale-colored polyisocyanate mixture had a solids content of 72.6% by weight, a viscosity of 2602 mPa·s, an isocyanate content of 10.6% by weight and a color number of 54 APHA.

Preparation of Modified Polyisocyanate PIC 21

Using the procedure described for Polyisocyanates 1-18, 676.62 g of Desmodur® N 3200 were reacted with 22.33 g of butanediol monoacrylate and the product was subsequently polymerized at 160° C. by the addition of 1.05 g of di-tert-butyl peroxide. The resulting pale-colored polyisocyanate mixture had a solids content of 98.8% by weight, a viscosity of 46,272 mPa·s, an isocyanate content of 21.7% by weight and a color number of 50 APHA.

Preparation of Modified Polyisocyanate PIC 22

Using the procedure described for Polyisocyanates 1-18, 676.65 g of Desmodur® N 75 were reacted with 16.75 g of HPMA in 5.81 g of 1:1 methoxypropyl acetate (MPA)/xylene and the product was subsequently polymerized at 145° C. by the addition of 0.79 g of di-tert-butyl peroxide. The resulting pale-colored polyisocyanate mixture had a solids content of 74.9% by weight, a viscosity of 308 mPa·s, an isocyanate content of 15.6% by weight and a color number of 16 APHA.

Preparation of Modified Polyisocyanate PIC 23

Using the procedure described for Polyisocyanates 1-18, 676.59 g of Desmodur HL® were reacted with 13.40 g of HPMA[3] in 9.38 g of butyl acetate and the product was subsequently polymerized at 130° C. by the addition of 0.63 g of tert-butyl peroxy-2-ethylhexanoate, 50% in butyl acetate. The resulting pale-colored polyisocyanate mixture had a solids content of 62.3% by weight, a viscosity of 2182 mPa·s, an isocyanate content of 10.3% by weight and a color number of 39 APHA.

Preparation of Modified Polyisocyanate PIC 24

Using the procedure described for Polyisocyanates 1-18, 676.60 g of Desmodur IL® were reacted with 13.39 g of HPMA in 11.48 g of butyl acetate and the product was subsequently polymerized at 130° C. by the addition of 0.54 g of tert-butyl peroxy-2-ethylhexanoate, 50% in butyl acetate.

The resulting pale-colored polyisocyanate mixture had a solids content of 52.1% by weight, a viscosity of 2522 mPa·s, an isocyanate content of 7.35% by weight and a color number of 94 APHA.

Preparation of Modified Polyisocyanate PIC 25

Using the procedure described for Polyisocyanates 1-18, 601.9 g of Desmodur® N 3600 in solution in 35.0 g of butyl acetate were reacted with 13.42 g of HEMA. Thereafter 13.42 g of styrene were added and the mixture was subsequently polymerized at 100° C. by the addition of 0.62 g of tert-butyl peroxy-2-ethylhexanoate in 35.64 g of butyl acetate. The resulting colorless polyisocyanate mixture had a solids content of 89.7% by weight, a viscosity of 1531 mPa·s, an isocyanate content of 18.7% by weight and a color number of 9 APHA.

Preparation of Modified Polyisocyanate PIC 26

Using the procedure described for Polyisocyanates 1-18, 601.9 g of Desmodur® N 3600 in 35.0 g of butyl acetate were reacted with 13.42 g of HEMA. Thereafter 13.42 g of methyl methacrylate were added and the mixture was subsequently polymerized at 100° C. by the addition of 0.62 g of tert-butyl peroxy-2-ethylhexanoate in 35.64 g of butyl acetate. The resulting colorless polyisocyanate mixture had a solids content of 89.9% by weight, a viscosity of 2662 mPa·s, an isocyanate content of 18.9% by weight and a color number of 15 APHA.

Preparation of Modified Polyisocyanate PIC 27

Using the procedure described for Polyisocyanates 1-18, 601.9 g of Desmodur® N 3600 in 35.0 g of butyl acetate were reacted with 13.42 g of HEMA. Thereafter 13.42 g of styrene were added and the mixture was subsequently polymerized at 100° C. by the addition of 0.62 g of tert-butyl peroxy-2-ethylhexanoate in 35.64 g of butyl acetate. The resulting colorless polyisocyanate mixture had a solids content of 89.7% by weight, a viscosity of 1531 mPa·s, an isocyanate content of 18.7% by weight and a color number of 9 APHA.

Preparation of Modified Polyisocyanate PIC 28

Using the procedure described for Polyisoeyanates 1-18, 601.9 g of Desmodur® XP 2410 in 35.0 g of butyl acetate were reacted with 13.42 g of HEMA. Thereafter 13.42 g of styrene were added and the mixture was subsequently polymerized at 100° C. by the addition of 0.62 g of tert-butyl peroxy-2-ethylhexanoate in 35.64 g of butyl acetate. The resulting colorless polyisocyanate mixture had a solids content of 89.8% by weight, a viscosity of 1010 mPa·s, an isocyanate content of 18.65% by weight and a color number of 16 APHA.

Preparation of Modified Polyisocyanate PIC 29

Using the procedure described for Polyisocyanates 1-18, 601.9 g of Desmodur®XP 2410 in 35.0 g of butyl acetate were reacted with 13.42 g of HEMA. Thereafter 13.42 g of methyl methacrylate were added and the mixture was subsequently polymerized at 100° C. by the addition of 0.62 g of tert-butyl peroxy-2-ethylhexanoate in 35.64 g of butyl acetate. The resulting polyisocyanate mixture had a solids content of 90.0% by weight, a viscosity of 919 mPa·s, an isocyanate content of 19.2% by weight and a color number of 11 APHA.

Use Examples

These examples describe the preparation of ready-to-use coating compositions based on the polyisocyanates PIC in comparison with the corresponding non-polyacrylate-modified starting polyisocyanates, the application of these coating compositions, and the testing of the resulting coating films.

The general coating properties were assessed by preparing transparent varnishes. For that purpose the polyisocyanates were each combined with a polyol at an NCO/OH equivalent ratio of 1:1. The polyol used was Desmophen® A 870, a polyacrylate polyol available from Bayer MaterialScience AG, Leverkusen, DE, which has a solids content of 70% by weight in butyl acetate, a viscosity of 3500 mPa·s at 23° C., an acid number of 7.5 mg KOH/g (based on as-supplied form) and an OH content of 2.95% by weight (based on as-supplied form). Based on resin solids (sum of the solid fractions of polyol and polyisocyanate) the following amounts of additives were used.

| Constituents | | % by weight, solids on solids |
|---|---|---|
| Dabco 33 LV | (PU catalyst from Air Products, 10% in butyl acetate) | 0.3 |
| BYK 331 | (Flow control agent from BYK-Chemie Wesel, DE, 50% in butyl acetate) | 0.3 |
| BYK 141 | (Silicone defoamer from BYK-Chemie Wesel, DE, 3% in 11:2 alkylbenzene/isobutanol) | 0.03 |
| Tinuvin 292 | (Light stabilizer from Ciba Geigy Basel, CH, 50% in xylene) | 1.0 |

A mixture of solvent naphtha 100, methoxypropyl acetate, xylene and n-butyl acetate (1:1:1:1) was added which resulted in a binder content of 56% by weight and an additives content of 2% by weight. The flow time (DIN 53 211, 4-mm nozzle) of the resulting varnishes was 25 s. The varnishes are in a ready-to-spray formulation and have a VOC (volatile organic compounds) content of 3.5 lbs/gal.

The pot life was tested by measuring the increase in viscosity of the varnishes over a period of 7 hours.

The varnishes were applied to glass plates at 23° C. and 50% relative humidity, dried both at room temperature and at 60° C. for 30 minutes, during which the drying rate (DIN 53 150) was determined, and then stored at room temperature for 7 days. The dry film thickness was 55 to 60 μm. Thereafter the König hardness (DIN 53 157), the Gardner gloss at an angle of 20°, the Haze (DIN 67 530), and the water and solvent resistance using water, super-grade petrol, methoxypropyl acetate and xylene [instantaneous, and after 1, 4 and 7 days after curing at 60° C. for 30 minutes] were tested.

Table 3 below set forth the test results of the tested varnishes of the invention and of the comparison varnishes.

TABLE 3

Test results of transparent 2K PU varnishes (B1 = ® Desmodur N 3300, B2 = ® Desmodur N 3600)

| Varnish based on polyisocyanate | | PIC 1 | PIC 2 | PIC 4 | PIC 5 | PIC 8 | PIC 9 | PIC 11 | PIC 12 | B1 | B2 |
|---|---|---|---|---|---|---|---|---|---|---|---|
| Viscosity (s) | instantaneous | 24 | 24 | 25 | 25 | 25 | 25 | 24 | 25 | 25 | 25 |
| after | 1 h | 24 | 26 | 25 | 25 | 25 | 25 | 25 | 25 | 25 | 25 |
| | 2 h | 25 | 26 | 25 | 26 | 25 | 25 | 25 | 25 | 25 | 26 |
| | 3 h | 26 | 26 | 26 | 26 | 26 | 25 | 25 | 25 | 26 | 27 |
| | 4 h | 26 | 26 | 27 | 26 | 26 | 26 | 26 | 26 | 27 | 27 |

TABLE 3-continued

Test results of transparent 2K PU varnishes (B1 = ® Desmodur N 3300, B2 = ® Desmodur N 3600)

|  |  | | | | | | | | | | |
|---|---|---|---|---|---|---|---|---|---|---|---|
|  | 5 h | 27 | 27 | 28 | 28 | 27 | 27 | 27 | 28 | 27 | 27 |
|  | 6 h | 28 | 29 | 28 | 28 | 27 | 27 | 28 | 28 | 29 | 28 |
| Gloss (∠20°) |  | 91 | 91 | 90 | 91 | 90 | 90 | 91 | 92 | 92 | 92 |
| Haze |  | <10 | <10 | 14 | 10 | 14 | 12 | <10 | <10 | <10 | <10 |
| Drying (h) | T1 | 1.5 | 1.5 | 1.5 | 1.0 | 2.0 | 2.0 | 2.0 | 2.0 | 2.0 | 2.5 |
|  | T2 | 5.0 | 4.5 | 4.0 | 4.0 | 5.5 | 5.5 | 5.5 | 5.5 | 5.5 | 8.0 |
|  | T3 | 5.5 | 5.5 | 5.0 | 5.0 | 6.5 | 6.5 | 7.0 | 6.0 | 8.0 | >8 |
|  | T4 | 7.5 | 7.0 | 7.5 | 7.5 | 8.0 | 8.0 | 8.0 | 8.0 | >8 | >8 |
| Pendulum damping | instantaneous | 37 | 39 | 38 | 36 | 58 | 51 | 34 | 31 | 32 | 21 |
| (s) | +1 d RT | 131 | 141 | 127 | 130 | 137 | 134 | 124 | 112 | 124 | 98 |
| after 30 min at | 4 d RT | 167 | 177 | 167 | 166 | 157 | 157 | 151 | 148 | 164 | 141 |
| 60° C. | 7 d RT | 171 | 181 | 173 | 170 | 161 | 163 | 162 | 152 | 164 | 145 |
| Water resistance[1)2)] | instantaneous | 2 | 2 | 2 | 2 | 2 | 2 | 2 | 2 | 3 | 4 |
| after 30 min at | +1 d RT | 0 | 0 | 0 | 0 | 0 | 0 | 0 | 0 | 0 | 0 |
| 60° C. | 4 d RT | 0 | 0 | 0 | 0 | 0 | 0 | 0 | 0 | 0 | 0 |
|  | 7 d RT | 0 | 0 | 0 | 0 | 0 | 0 | 0 | 0 | 0 | 0 |
|  | 16 h 50° C. | 0 | 0 | 0 | 0 | 0 | 0 | 0 | 0 | 0 | 0 |

[1)]Exposure time: 60 minutes
[2)]= best worth (without any damage), 5 = poorest worth (film dissolved)

| Varnish based on polyisocyanate |  | PIC 1 | PIC 2 | PIC 4 | PIC 5 | PIC 8 | PIC 9 | PIC 11 | PIC 12 | B1 | B2 |
|---|---|---|---|---|---|---|---|---|---|---|---|
| Super-grade petrol | instantaneous | 4 | 4 | 4 | 4 | 4 | 4 | 4 | 4 | 4-5 | 4-5 |
| resistance[1)2)] | +1 d RT | 2 | 1-2 | 1-2 | 2 | 2 | 2 | 1-2 | 2 | 2-3 | 2-3 |
| after 30 min at | 4 d RT | 0 | 0 | 0 | 0 | 0-1 | 0-1 | 0 | 0 | 0 | 0-1 |
| 60° C. | 7 d RT | 0 | 0 | 0 | 0 | 0 | 0 | 0 | 0 | 0 | 0 |
|  | 16 h 50° C. | 0 | 0 | 0 | 0 | 0 | 0 | 0 | 0 | 0 | 0 |
| MPA resistance[1)2)] | instantaneous | 4 | 4 | 4 | 4 | 4 | 4 | 4 | 4 | 5 | 5 |
| after 30 min at | +1 d RT | 2 | 3 | 2 | 2 | 3 | 2 | 3 | 3 | 3 | 4 |
| 60° C. | 4 d RT | 1 | 1 | 0 | 1 | 1 | 1 | 1 | 1 | 1 | 1 |
|  | 7 d RT | 1 | 0-1 | 0 | 1 | 1 | 1 | 1 | 1 | 1 | 1 |
|  | 16 h 50° C. | 1 | 0-1 | 0 | 1 | 1 | 1 | 1 | 1 | 1 | 1 |
| Xylene | instantaneous | 4 | 4 | 4 | 4 | 4 | 4 | 4 | 4 | 5 | 5 |
| resistance[1)2] | +1 d RT | 3 | 3 | 2 | 2 | 3 | 2 | 3 | 3 | 3 | 4 |
| after 30 min at | 4 d RT | 1 | 1 | 0-1 | 1 | 1 | 1 | 1 | 0 | 1 | 1 |
| 60° C. | 7 d RT | 1 | 0-1 | 0-1 | 0 | 1 | 1 | 0-1 | 0 | 1 | 0 |
|  | 16 h 50° C | 0-1 | 0-1 | 0-1 | 0 | 0 | 0 | 0 | 0 | 0-1 | 0 |
| Sulphuric acid, 2% strength[1)2)] | 7 d RT | 0 | 0 | 0 | 0 | 0 | 0 | 0 | 0 | 0 | 0 |
| Sodium hydroxide solution, 2% strength[1)2] | 7 d RT | 0 | 0 | 0 | 0 | 0 | 0 | 0 | 0 | 0 | 0 |

[1)]Exposure time: 5 minutes
[2)]= best worth (without any damage), 5 = poorest worth (film dissolved)

Both the inventive varnishes based on the polyacrylate-modified polyisocyanates and the comparison varnishes based on polyisocyanates B) had a long processing life without a marked rise in viscosity and yielded high gloss varnish films having very low Haze values. The tests also demonstrated that the inventive coatings based on PICs 1, 2, 4 and 5, in contrast to the comparison varnish based on unmodified polyisocyanate B1, exhibited more rapid drying, a higher hardness and a slightly better solvent resistance. The same results were also obtained by the inventive varnishes based on PIC 8, PIC 9, PIC 11 and PIC 12 when compared to the comparison varnish based on unmodified polyisocyanate B2. The test results demonstrated the clear advantages of the varnishes of the invention, particularly with respect to the important properties of drying rate, hardness and early water and solvent resistance, which play a significant part, particularly in automotive refinishing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a liquid polyacrylate-modified polyisocyanate of the formula (I):

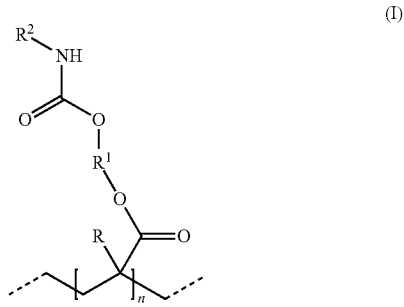

wherein R is hydrogen or a methyl group, $R^1$ is an optionally heteroatom-containing hydrocarbon radical, $R^2$ is a hydrocarbon radical having at least one isocyanate group and optionally a urethane, allophanate, biuret, uretdione, isocyanurate or iminooxadiazinedione group, and n is a number $\geq 1$; the process comprising:

(a) providing a starting polyisocyanate selected from the group consisting of aromatic, araliphatic, cycloaliphatic, and aliphatic polyisocyanates and mixtures thereof having an NCO content of 5% to 25% by weight, an NCO functionality ≧2 and a viscosity measured as solvent free resin of 150 to 200,000 mPa·s at 23° C.;

(b) reacting a portion of the isocyanate groups of the starting polyisocyanate with a monoalcohol containing acrylate and/or methacrylate groups to form urethane groups, such that not more than 40 mole % of the isocyanate groups in the starting polyisocyanate are converted to urethane groups; and (c) subsequently to or simultaneously with the urethanization, reacting the unsaturated groups of the resulting reaction product by free-radically initiated polymerization optionally with other additional unsaturated monomers, to form the liquid polyacrylate-modified polyisocyanate of the formula (I).

2. The process according to claim 1, wherein the starting polyisocyanate comprises a polyisocyanate containing a urethane, uretdione, allophanate, biuret, isocyanurate or iminooxadiazinedione group and exclusively containing aliphatically and/or cycloaliphatically bound NCO groups.

* * * * *